United States Patent Office 2,811,834
Patented Nov. 5, 1957

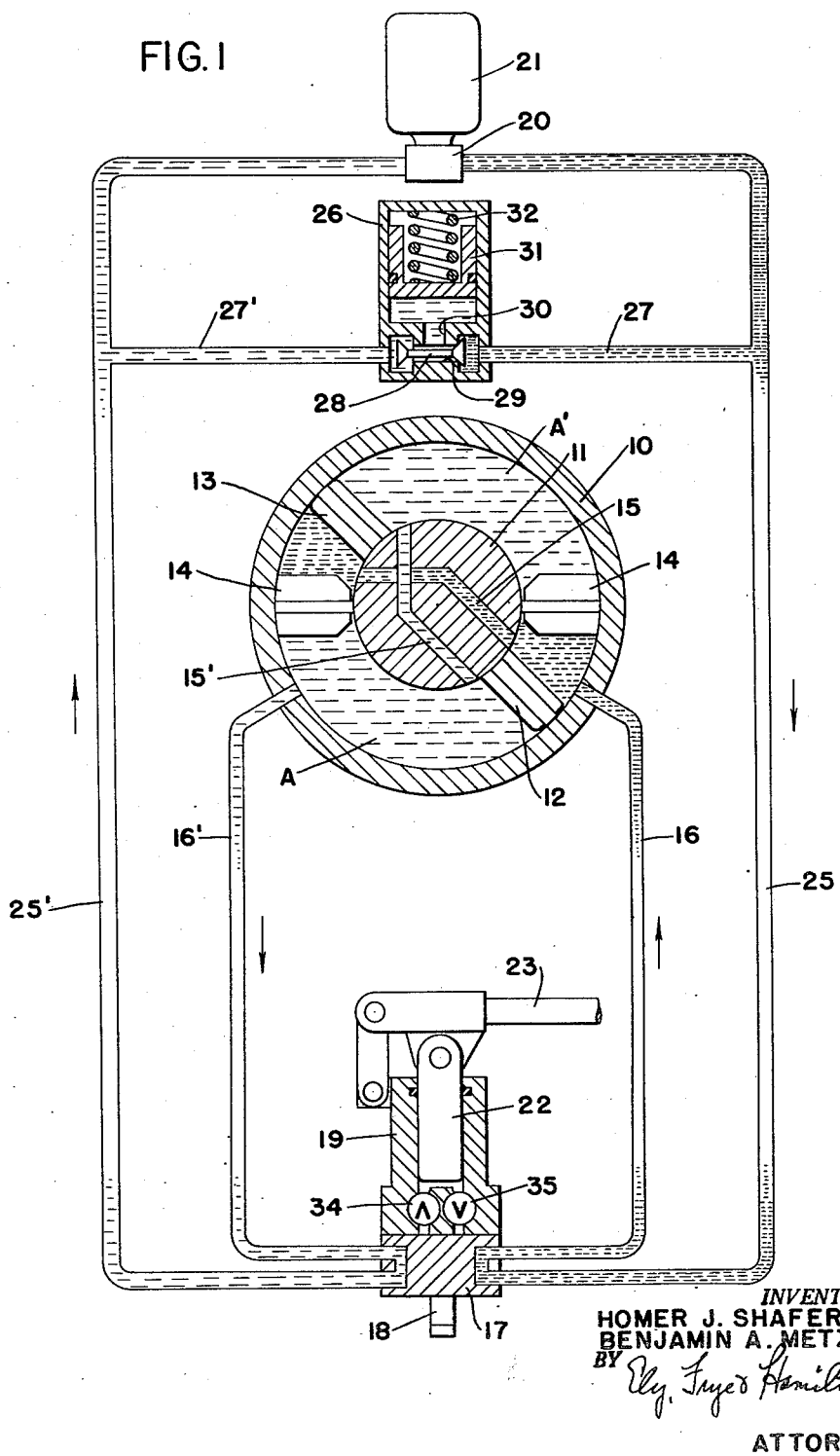

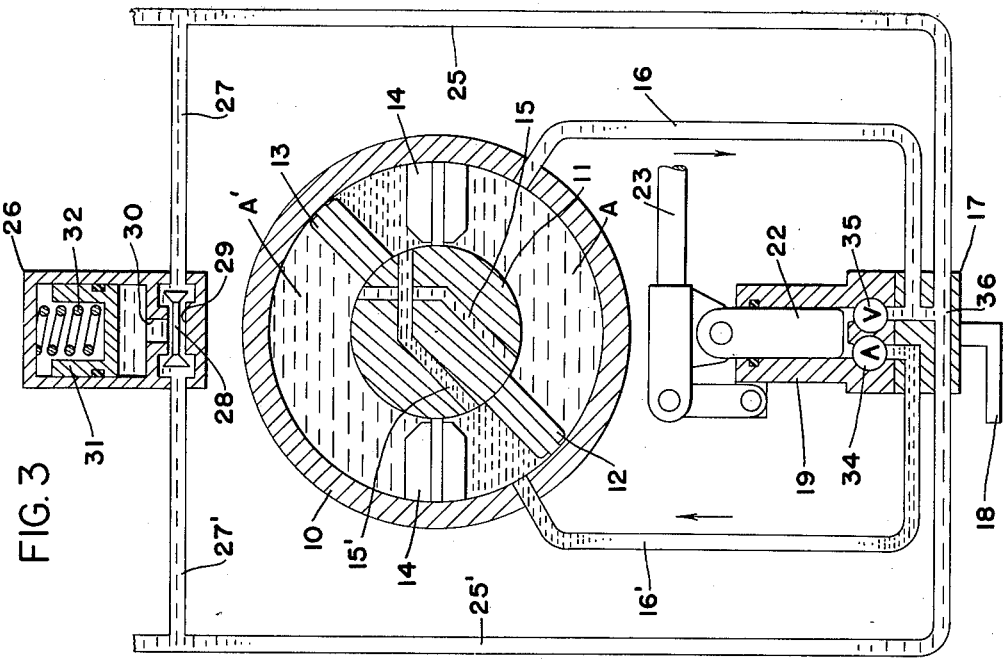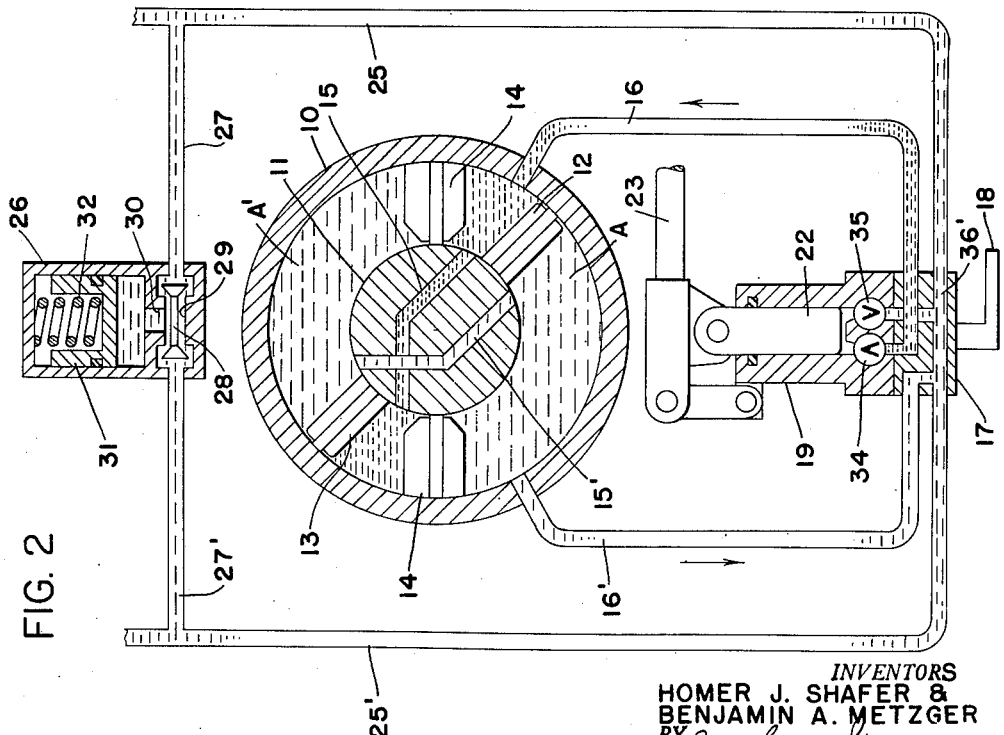

2,811,834

MANUAL AND MOTOR DRIVE FOR HYDRAULIC VALVE OPERATOR

Homer J. Shafer and Benjamin A. Metzger, Mansfield, Ohio, assignors, by mesne assignments, to Shafer Valve Company, Mansfield, Ohio, a corporation of Ohio Application November 21, 1955, Serial No. 548,123

2 Claims. (Cl. 60—52)

This invention relates generally to fluid systems including hydraulic motors for operating pipe line valves, and more particularly to improved means for actuating the hydraulic motor selectively by a hand pump or a motor driven pump.

In many installations the hydraulic operators for piping valves are actuated by a motor driven pump which may have an automatic or remote control. Where such valves are located in gas and oil lines an emergency, hand-operated means must be provided in case the power for the pump motor fails, and a mechanical, hand-operated means is conventional. Such means comprises a hand wheel operatively connected to the valve stem by suitable gearing, but the operation of large valves under pressure by such means is extremely hard work.

This application is a continuation-in-part of the co-pending application of said Homer J. Shafer, Serial No. 348,355, filed April 15, 1953, which discloses a rotary hydraulic motor mounted on the valve stem of a rotary valve and selectively operated by a hand operated gear pump or an electric motor mounted on the hydraulic motor. In said application the independent operation of two separate diverter valves is required to shift from manual to motor operation, or vice versa, and the manual operation of the gear pump by a hand wheel is slow and laborious. Moreover, no provision is made to take care of the expansion of oil in the system.

In the present application a reservoir is provided to insure a fluid supply without vacuum to the suction side of either pump when it is operating, and a shuttle valve automatically connects the suction side of the motor pump to the reservoir when the electric pump is operating.

It is an object of the present invention to provide a novel and improved manual and motor drive system for a hydraulic valve operator which selectively utilizes a piston type hand pump or a motor-driven pump, and has a single control valve for changing from manual to motor drive.

Other objects include the provision of a reservoir connected to the control valve in such manner as to selectively supply fluid to the suction side of either pump, in addition to the fluid from the exhaust of the hydraulic valve operator.

These and other objects are accomplished by the parts, combinations and arrangements comprising the present invention, a preferred embodiment of which is shown by way of example in the accompanying drawings and described in detail herein. Various modifications and changes in details of construction are within the scope of the invention as defined in the appended claims.

In the drawings:

Fig. 1 is a schematic view of the improved system applied to a hydraulic valve operator, with the control valve set to connect the motor pump to the operator for closing the pipe line valve operated thereby.

Fig. 2 is a similar view with the control valve set to connect the hand pump to the operator for closing the pipe line valve.

Fig. 3 is a similar view with the control valve set to connect the hand pump to the operator for opening the pipe line valve.

The improved system is shown by way of example as applied to a rotary hydraulic motor operating a rotary valve in a pipe line. The rotary hydraulic motor is indicated at 10 and has a rotor 11 which may be directly keyed onto the valve stem of the rotary valve (not shown), and the motor may be supported on a flange of the valve, in a manner such as shown in said application Serial No. 348,355. The rotor 11 is preferably provided with diametrically opposite vanes 12 and 13 which extend across the annular chamber between the rotor and the outer cylindrical wal of the motor 10.

A pair of diametrically opposite stationary shoes or stops 14 divides the annular chamber into two parts A and A' and one vane oscillates in each part of the chamber between the shoes. The portions of the two parts of the chamber which are partitioned by the vanes are preferably interconnected on opposite sides of the vanes by cross over ports 15 and 15' extending through the rotor hub 11, so that pressure is exerted on the reverse sides of opposite vanes to turn the rotor with balanced torque in either direction. Conduits 16 and 16' for circulating fluid to and from the motor chamber in reverse directions may be connected to the two parts A and A' on opposite sides of one of the vanes, such as vane 12 as shown.

The conduits 16 and 16' are connected to a multi-way control valve having a selector disk 17 rotatable by a handle 18 for selectively connecting the conduits to a hand pump indicated at 19 or to a pump 20 driven by an electrical motor 21. The pump 20 may be a gear pump and the motor 21 is reversible to drive the pump in opposite directions. The hand pump 19 is a piston type pump, and has a piston 22 reciprocated by the handle 23 mounted on the pump body. As shown, the selector disk 17 may be rotatably mounted on the body of the hand pump.

When the selector disk 17 of the control valve is in the position of Fig. 1, the motorized pump 20 is connected to the hydraulic motor 10 for operating it, and the hand pump 19 is by-passed. In this position the selector disk 17 connects the conduits 16 and 16' with conduits 25 and 25', respectively, leading to the pump 20. If the pump 20 is driven in the direction to cause fluid to flow in the direction of the arrows through conduit 25 and conduit 16 into the motor 10, the rotor 11 will be rotated clockwise to close the pipe line valve to which it is connected. As the rotor rotates, fluid will exhaust from the motor through conduits 16' and 25' to the suction side of pump 20. Driving the pump 20 in the reverse direction will reverse the flow through the conduits and rotate the rotor 11 counterclockwise.

A fluid reservoir 26 is connected in parallel between the conduits 25 and 25' by conduits 27 and 27', and a shuttle valve 28 floats in the passageway 29 which extends through the end of the reservoir and connects the two conduits 27 and 27'. At the outer ends of the passageway 29 are valve seats for selectively seating the ends of the shuttle valve, so that when one end of the passageway 29 is open the other end is closed. Between the valve seats the passageway 29 communicates with the interior of the reservoir 26 through port 30.

As shown, the reservoir may have a piston 31 therein, urged toward the port 30 by a spring 32, so that if heavy oil or light grease is used as the pressure fluid, the fluid in the reservoir is forced out through port 30 into the conduit system.

As the pump 20 forces fluid through conduit 25 and thence through conduit 16 to the motor 10, the pressure in line 25 closes the shuttle valve to shut off the connection between conduit 27 and reservoir 26 and opens the reservoir to conduit 27'. Thus the conduit 25' supplies the suction side of pump 20 with pressure fluid from the reservoir as well as from the exhaust side of the motor 10, thereby insuring a full supply of pressure fluid under varying conditions without creating any vacuum in the suction line. When the selector disk 17 of the control valve is in the position of Fig. 2, the hand pump 19 is connected to the conduits 16 and 16' for rotating the rotor 11 clockwise to close the pipe line valve. The pressure line of the pump 19 has a check valve 34 therein, allowing flow only in a direction away from the pump, and is connected by disk 17 directly with conduit 16. The suction line of the pump 19 has a check valve 35 therein, allowing flow only in a direction toward the pump, and is connected by disk 17 with conduit 16'. The suction line of the pump embodying check valve 35 and the conduit 16' are both connected, in the position of Fig. 2, to a through passage 36 in the selector disk connecting the conduits 25 and 25'.

Accordingly, on the suction stroke of the pump 19 fluid is supplied thereto from the exhaust line 16' of the motor, and also from the reservoir 26 through either line 25 or 25', shuttle valve 28 being open at both ends to conduits 27 and 27'.

When the selector disk 17 of the control valve is in the position of Fig. 3, the pressure line of pump 19 is connected directly with conduit 16', and the suction line is connected to conduit 16 and also to a through passage 36' in the selector disk connecting the conduits 25 and 25'. Thus, on the suction stroke of the pump 19, fluid is supplied thereto from the exhaust line 16 and also from the reservoir 26 through either line 25 or 25', shuttle valve 28 being open at both ends to conduits 27 and 27'.

In either the position of Fig. 2 or Fig. 3, flow is from the hand pump to the motor 10, and from the motor through the selector disk and back to the suction side of the hand pump. Thus the power pump 20 is in effect bypassed even though the reservoir 26 is connected to the suction side of the hand pump in both positions.

It will be noted that with the selector disk 17 in either the position of Fig. 2 or Fig. 3, if the pump 20 should be accidentally operated in either direction, the operation of the hand pump would not be affected because fluid from the pump 20 will merely flow in the closed circuit provided by the conduits 25 and 25' and the through passage 36 or 36'.

During operation of the hydraulic valve operator motor 10 by the electric pump 20 as in Fig. 1, or by the hand pump 19 as in Figs. 2 and 3, the reservoir is always connected to the suction side of the pump so as to compensate for fluctuations in fluid supply due to temperature variations and the like, thereby insuring a full supply of fluid to the pump without air or vacuum.

It will be understood that the disclosure of the control valve comprising the selector disk 17 and handle 18 is schematic, and that the construction of such valve may be varied, so long as the valve functions to connect the various conduits in the manner described in connection with Figs. 1, 2 and 3.

What is claimed is:

1. A manual and motor drive system for selectively operating a hydraulic motor having pressure and exhaust connections including a reversible power-driven pump, a hand-driven piston pump having pressure and suction connections, conduits connected to the pressure and suction sides of said power-driven pump, a fluid reservoir having a common connection with said conduits for connecting said reservoir in parallel with said power-driven pump and said hand-driven pump, a shuttle valve movable in said common connection and adapted selectively to connect one or both conduits to said reservoir, and a multi-way control valve for selectively connecting the pressure and exhaust connections of said hydraulic motor with said power-driven pump or with said hand-driven pump, said control valve having a through passageway for connecting said conduits together when the hand-driven pump is connected to the hydraulic motor, and ducts in the control valve for simultaneously connecting said passageway to the exhaust connection of the hydraulic motor and to the suction side of said hand pump.

2. A manual and motor drive system for selectively operating a hydraulic motor having pressure and exhaust connections, including a reversible power-driven pump having pressure and suction connections, a hand-driven piston pump having pressure and suction connections, a multi-way control valve for selectively connecting the pressure and exhaust motor connections to the pressure and suction connections of either pump, conduits connecting the pressure and suction sides of the power-driven pump with said control valve, said control valve having a through passageway for connecting said conduits together when the hand-driven pump is connected to the hydraulic motor and having passageways for simultaneously connecting said passageway to the hydraulic motor exhaust connection and to the suction connection of the hand pump, a fluid reservoir connected to said conduits in parallel with said power-driven pump and said hand-driven pump, a spring-actuated piston in said reservoir urging fluid therein toward said conduit connection, and a shuttle valve adapted selectively to connect one or both conduits to said reservoir.

References Cited in the file of this patent

UNITED STATES PATENTS

| 1,616,841 | Beebe | Feb. 8, 1927 |
| 2,479,063 | Forsythe | Aug. 16, 1949 |
| 2,597,050 | Audemar | May 20, 1952 |
| 2,680,952 | Hurkamp et al. | June 15, 1954 |